United States Patent [19]
McCarthy

[11] Patent Number: 5,738,365
[45] Date of Patent: Apr. 14, 1998

[54] COLLAPSIBLE CART

[76] Inventor: Phillip R. McCarthy, 19270 Greeno Rd. #68, Fairhope, Ala. 36532

[21] Appl. No.: 584,263

[22] Filed: Jan. 11, 1996

[51] Int. Cl.$^6$ .................................................. B62B 3/02
[52] U.S. Cl. ........................ 280/651; 280/79.11; 280/79.3
[58] Field of Search .............................. 280/638, 639, 280/42, 651, 659, 47.34, 47.35, 79.11, 79.3

[56] References Cited

U.S. PATENT DOCUMENTS

| | | | |
|---|---|---|---|
| 1,828,684 | 10/1931 | Scarlett | 282/651 |
| 3,788,659 | 1/1974 | Allen | 280/5.24 |
| 3,827,573 | 8/1974 | Guerette | 280/651 |
| 4,523,768 | 6/1985 | Dlubala | 280/651 |
| 4,537,421 | 8/1985 | Teachout | 280/654 |
| 5,118,130 | 6/1992 | Kaltz | 280/154 |
| 5,380,033 | 1/1995 | Harling | 280/654 |

*Primary Examiner*—Richard M. Camby
*Attorney, Agent, or Firm*—Joseph N. Breaux

[57] ABSTRACT

A collapsible cart including a base member, first and second double L-shaped brackets, a pair of locking pins, and two locking bar members. The locking bar members and locking pins are utilized to lock the double L-shaped brackets into place when the cart is in the un-collapsed configuration.

1 Claim, 2 Drawing Sheets

COLLAPSIBLE CART

TECHNICAL FIELD

The present invention relates to carts for transporting items and more particularly to a cart for transporting items that has a support frame that is collapsible for easy storage of the cart.

BACKGROUND ART

It is often desirable when having to move a large item or quantity of items to have a cart upon which the place the item or items that may be pushed on wheels between the locations. Although it is desirable to have such a cart, because of their size such carts can create storage and transportation problems of their own. It would be a benefit, therefore, to have a cart that was collapsible for easy transporting and storage but which could rapidly and easily be set up when use of the cart was required.

GENERAL SUMMARY DISCUSSION OF INVENTION

It is thus an object of the invention to provide a cart that is collapsible into a conveniently stored and transported shape and that is rapidly and easily set up when use of the cart is required.

Accordingly, a collapsible cart is provided. The cart includes a base member, supported by four swivel mounted wheel assemblies, having first and second pivot supports, each of a first predetermined length, and third and fourth pivot supports, each of a second predetermined length greater than the first predetermined length; a first double L-shaped bracket member having first and second pivot sections of a third predetermined length, and first and second linking sections, the first and second pivot sections being rigidly connected together by a first crossbar and having a base connection end that is pivotally secured to one of the first and second pivot supports in a manner such that the first and second pivot sections pivot in unison with respect to the base member, each first and second linking section being pivotally connected to a far end of one of the first and second pivoting sections and having a linking end having a pair of concentrically aligned locking pin receiving apertures, the first and second linking sections pivoting in parallel planes; a second double L-shaped bracket member having third and fourth pivot sections of a fourth predetermined length, and third and fourth linking sections, the third and fourth pivot sections being rigidly connected together by a second crossbar and having a base connection end that is pivotally secured to one of the third and fourth pivot supports in a manner such that the third and fourth pivot sections pivot in unison with respect to the base member, each third and fourth linking section being pivotally connected to a far end of one of the third and fourth pivoting sections and having a linking end mechanism having an inner cavity for receiving therein the linking end of one of the first and second linking sections and having a pair of concentrically aligned locking pin receiving apertures, the third and fourth linking sections pivoting in parallel planes; a first and second locking pin sized to pass at least partially through the locking pin receiving apertures, the first locking pin being secured to the third linking section with a first flexible member, the second locking pin being secured to the fourth linking section with a second flexible member; and at least one locking bar member pivotally connectable simultaneously between the base member and one of the L-shaped bracket members in a manner such that the L-shaped bracket does not pivot with respect to the base member.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
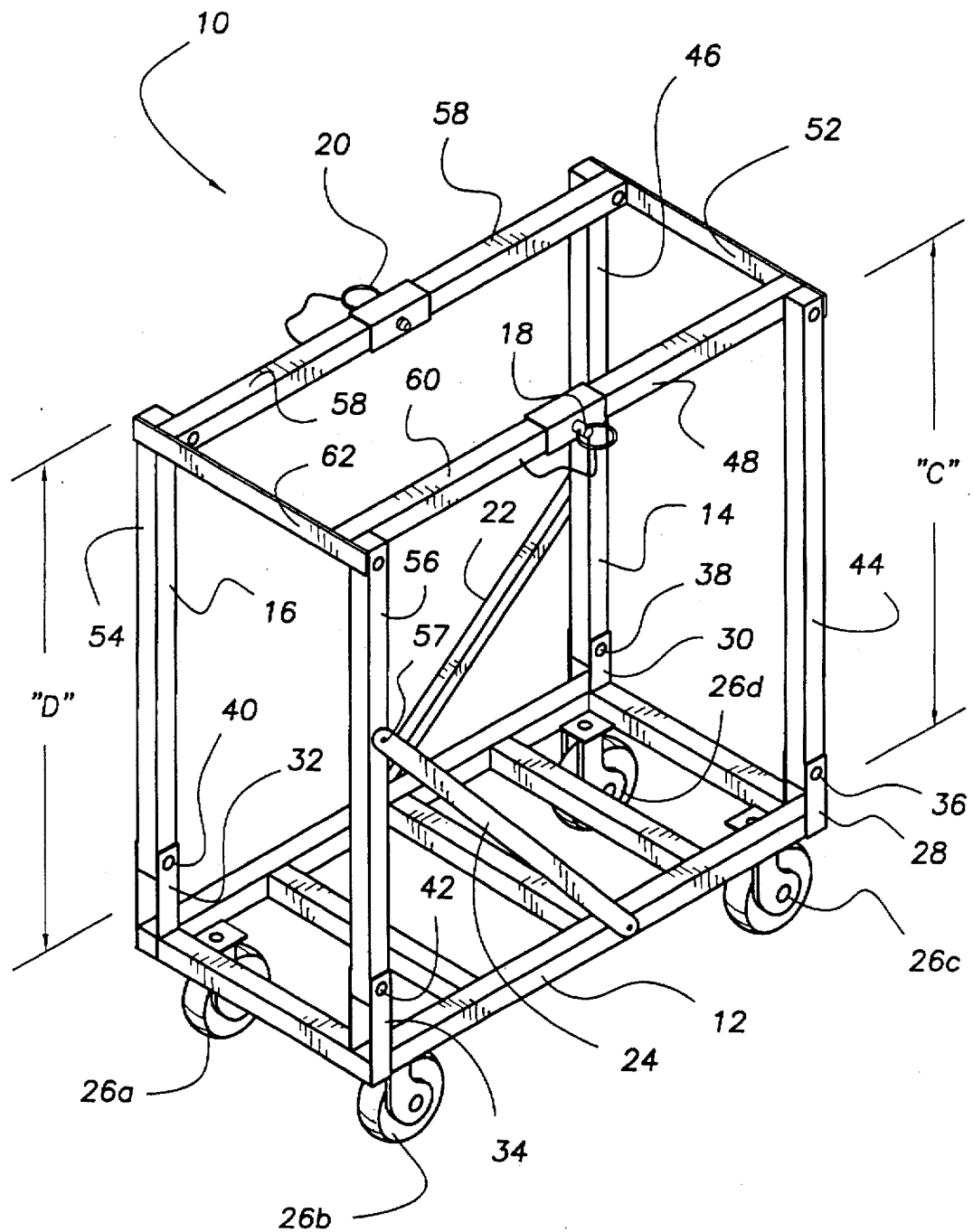
FIG. 1 is a perspective view of an exemplary embodiment of the collapsible cart of the present invention including the base member, the first and second double L-shaped brackets, a pair of locking pins, and two locking sleeve members.

FIG. 1 is a perspective view of an exemplary embodiment of the collapsible cart of the present invention generally designated by the numeral 10. Cart 10 includes a base member 12, a first double L-shaped bracket 14, a second double L-shaped bracket 16, a first and second locking pin 18,20, and a first and second locking bar member 22,24.

Base member 12 is constructed of lengths of aluminum tubing that have been welded together to form a two foot wide by four foot long rectangular member. Four swivel mounted wheel assemblies 26a–26d are secured to the four corners of one side of the rectangular member. First, second, third, and fourth pivot supports 28, 30, 32, 34 are attached to the four corner of the other side of the rectangular member. A two foot length side of the rectangular member is positioned between first and second pivot supports 28,30 and third and fourth pivot supports 32,34. First and second pivot supports 28,30 have pivot connections 36,38 located a distance "A" (FIG. 3) of about two inches above the rectangular member. Third and fourth pivot supports 32,34 have pivot connections 40,42 located a distance "B" (FIG. 3) of about three and one-half (3½") inches above the rectangular frame member.

First double L-shaped bracket member 14 has first and second pivot sections 44,46 constructed of lengths of aluminum tubing having a third predetermined length "C" of about forty-five (45") inches; and first and second linking sections 48,50. First and second pivot sections 44,46 are rigidly connected together by a first crossbar 52. Pivot section 44 is pivotally secured to first pivot support 28 at pivot connection 36. Second pivot section 46 is pivotally secured to second pivot support 30 at pivot connection 38.

First and second linking sections 48,50 are pivotally connected to the opposite ends of first and second pivoting sections 44,46, respectively. Each linking section 48,50 has a linking end 48a,50a having a pair of concentrically aligned locking pin receiving apertures formed therethrough (shown in FIG. 2).

Figure 2:
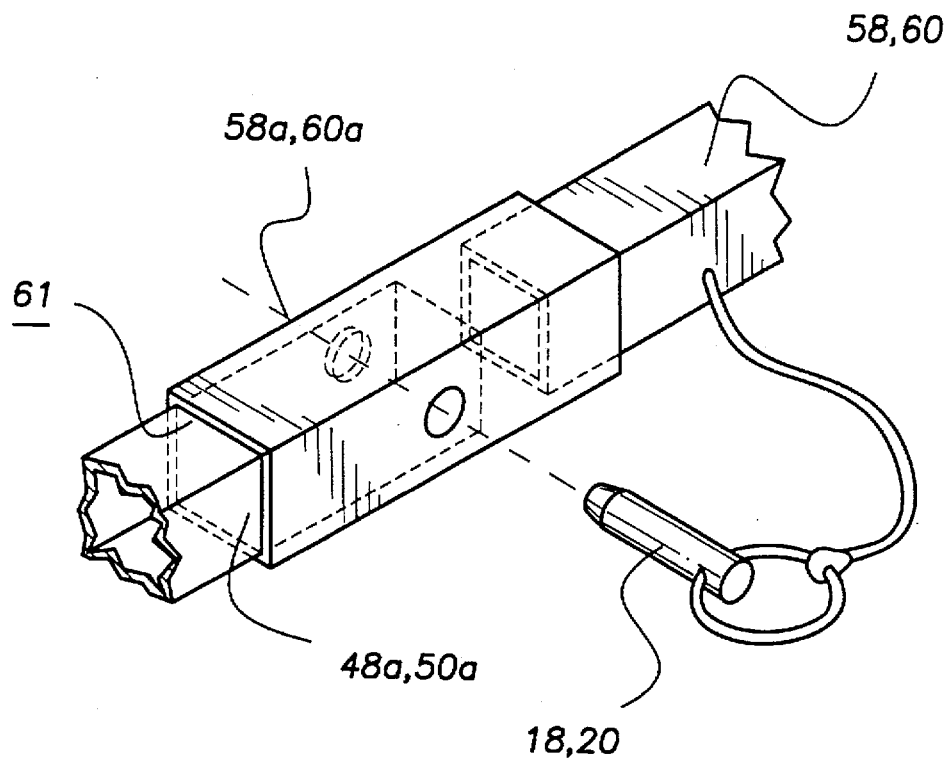
FIG. 2 is a perspective detail view of one of the linking end mechanisms and the locking pins.

Second double L-shaped bracket member 16 has third and fourth pivot sections 54,56 constructed from lengths of aluminum tubing having a fourth predetermined length "D" of about forty-three (43") inches; and third and fourth linking sections 58,60. Third and fourth pivot sections 54,56 are rigidly connected together by a second crossbar 62. Pivot section 54 is pivotally secured to third pivot support 32 at pivot connection 40. Fourth pivot section 56 is pivotally secured to fourth pivot support 34 at pivot connection 42. Third and fourth linking sections 58,60 are pivotally connected to the opposite ends of third and fourth pivoting sections 54,56, respectively. With reference to FIG. 2, each linking section 58,60 has a U-shaped cross-section, linking end mechanism 58a,60a having a pair of concentrically aligned locking pin receiving apertures formed therethrough. Each linking end mechanism 60a,58a has an inner cavity 61 for receiving therein the linking end 48a,50a, respectively, in a manner such that the locking pin receiving apertures of a locking end mechanism 60a,58a are aligned with the locking pin apertures of a linking end 48a,50a sufficiently to allow insertion therethrough in a locking manner one of the locking pins 18,20. When a locking pin 18,20 is thus inserted, linking sections 48,50 are fixed with respect to linking ends 60,58, respectively.

With reference once again to FIG. 1, first and second locking bar members 22,24 are pivotally connectable between frame member 12 and pivot sections 56,46, respectively. When pivoting sections 56,46 are perpendicularly oriented with respect to base member 12, first and second locking bar members 22,24 are attached to pivot sections 56,46 in a manner to prevent pivoting of pivot members 56,46 with respect to base member 12. In this embodiment, first and second locking bar members 22,24 are constructed from lengths of aluminum bar stock having an aperture to accommodate bar connectors 57 (FIG. 1), and 47 (FIG. 3).

Figure 3:
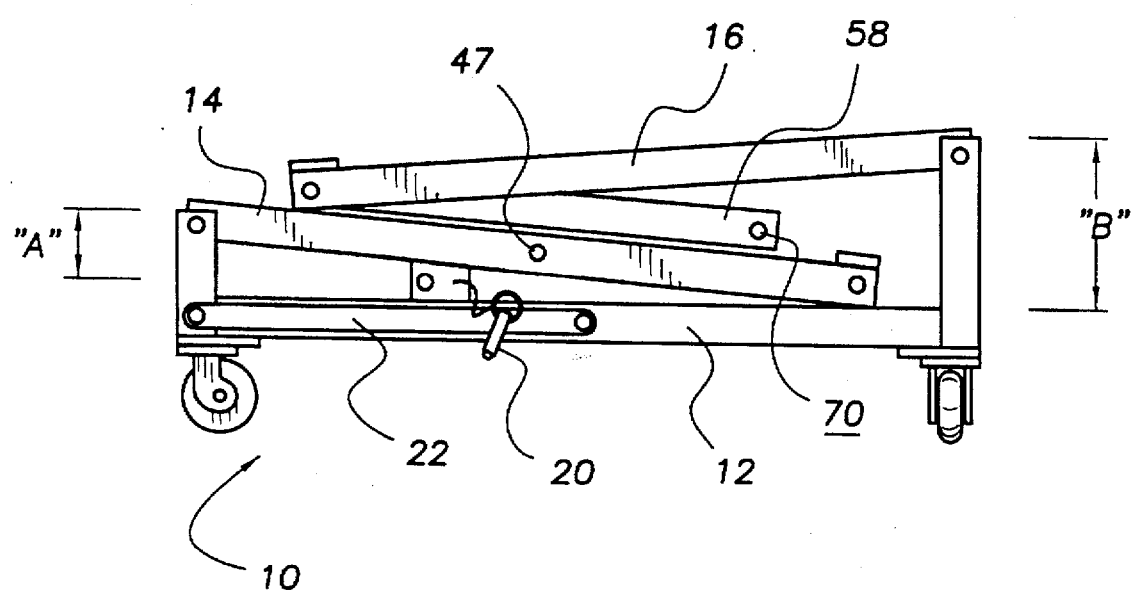
FIG. 3 is a side view of the embodiment of the collapsible cart shown in FIG. 1 showing the first and second double L-shaped brackets collapsed and one of the locking sleeve members positioned along one of the pivot sections out of the locking position.

FIG. 3 shows cart 10 in the collapsed configuration with first double L-shaped bracket 14 pivoted down onto base member 12 and second double L-shaped bracket 16 pivoted down onto first double L-shaped bracket 14. One of the locking pin apertures 70 is clearly shown at the end of linking section 58. When in the collapsed configuration, cart 10 may be suspended from a conventional J-hook located on a van or garage wall; or stored in another convenient place such as beneath a table or within the trunk of an automobile.

Cart 10 is easily set up by pivoting second double L-shaped bracket member 16 upward; pivoting locking bar member 24 into the locking position with second double L-shaped bracket member 16; rotating first double L-shaped bracket member 14 upward; pivoting locking bar member 22 into the locking position with first double L-shaped bracket member 14; positioning linking ends 48a,50a, respectively, into an inner cavity 61 of a locking end mechanism 58a,60a; and inserting a locking pin 18,20 through the aligned locking pin receiving apertures.

It can be seen from the preceding description that a cart has been provided that is collapsible into a conveniently stored and transported shape and that is rapidly and easily set up when use of the cart is required.

It is noted that the embodiment of the collapsible cart described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A collapsible cart comprising:

a base member, supported by four swivel mounted wheel assemblies, having first and second pivot supports, each of a first predetermined length, and third and fourth pivot supports, each of a second predetermined length greater than said first predetermined length;

a first double L-shaped bracket member having first and second pivot sections of a third predetermined length, and first and second linking sections, said first and second pivot sections being rigidly connected together by a first crossbar and having a base connection end that is pivotally secured to one of said first and second pivot supports in a manner such that said first and second pivot sections pivot in unison with respect to said base member, each first and second linking section being pivotally connected to a far end of one of said first and second pivoting sections and having a linking end having a pair of concentrically aligned locking pin receiving apertures, said first and second linking sections pivoting in parallel planes;

a second double L-shaped bracket member having third and fourth pivot sections of a fourth predetermined length, and third and fourth linking sections, said third and fourth pivot sections being rigidly connected together by a second crossbar and having a base connection end that is pivotally secured to one of said third and fourth pivot supports in a manner such that said third and fourth pivot sections pivot in unison with respect to said base member, each third and fourth linking section being pivotally connected to a far end of one of said third and fourth pivoting sections and having a linking end mechanism having an inner cavity for receiving therein said linking end of one of said first and second linking sections and having a pair of concentrically aligned locking pin receiving apertures, said third and fourth linking sections pivoting in parallel planes;

a first and second locking pin sized to pass at least partially through said locking pin receiving apertures, said first locking pin being secured to said third linking section with a first flexible member, said second locking pin being secured to said fourth linking section with a second flexible member; and at least one locking bar member pivotally connectable simultaneously between said base member and one of said L-shaped bracket members in a manner such that said L-shaped bracket does not pivot with respect to said base member.

* * * * *